Sept. 30, 1924.
W. T. SEARS
1,509,880
CHANGE SPEED MECHANISM FOR DRILLING MACHINES
Filed Sept. 30, 1920  3 Sheets-Sheet 1
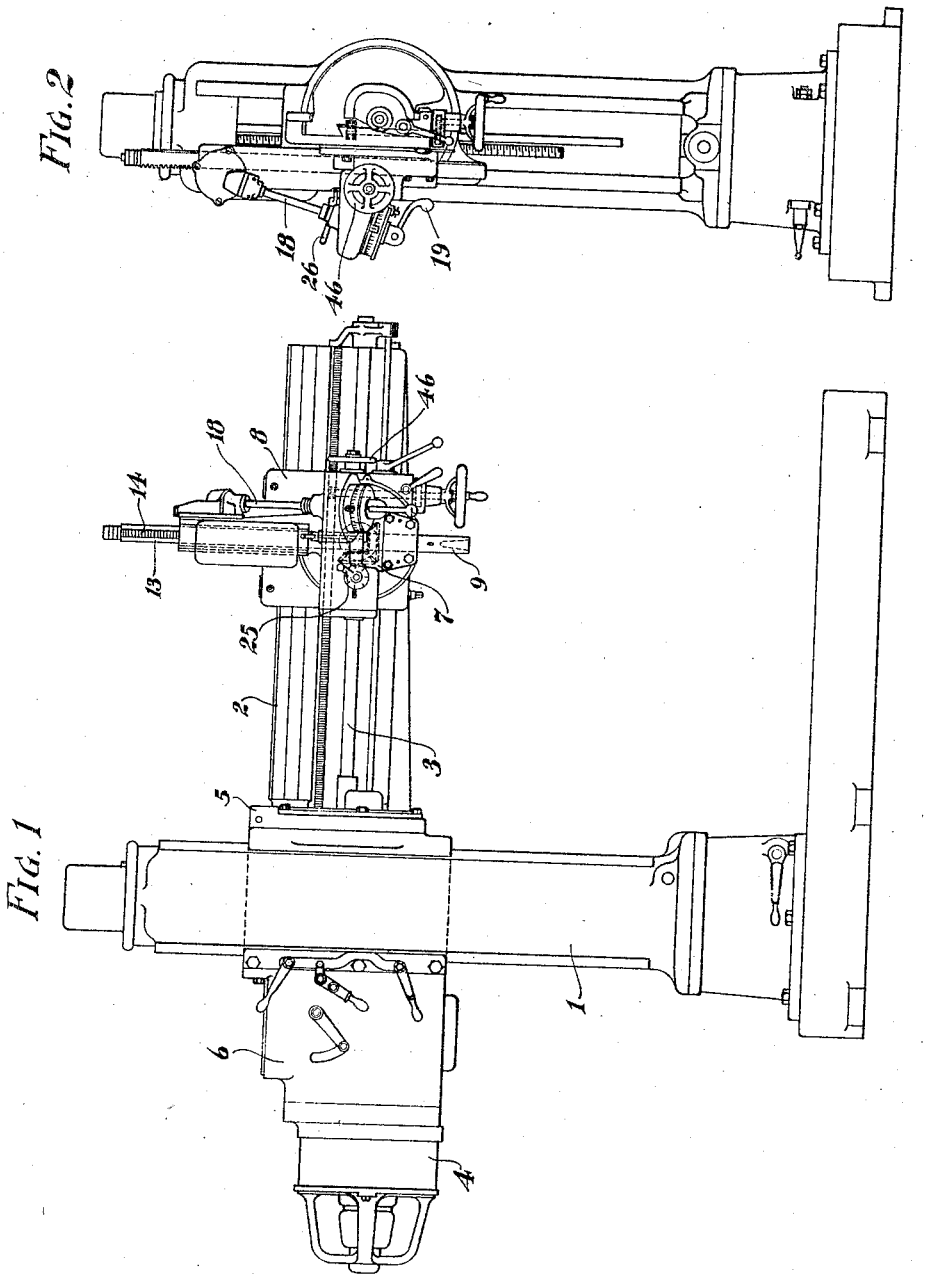
Inventor
Willard T. Sears
By S. Jay Teller
Attorney Sept. 30, 1924.

W. T. SEARS 1,509,880

CHANGE SPEED MECHANISM FOR DRILLING MACHINES

Filed Sept. 30, 1920  3 Sheets-Sheet 2

Sept. 30, 1924.
W. T. SEARS
1,509,880
CHANGE SPEED MECHANISM FOR DRILLING MACHINES
Filed Sept. 30, 1920    3 Sheets-Sheet 3
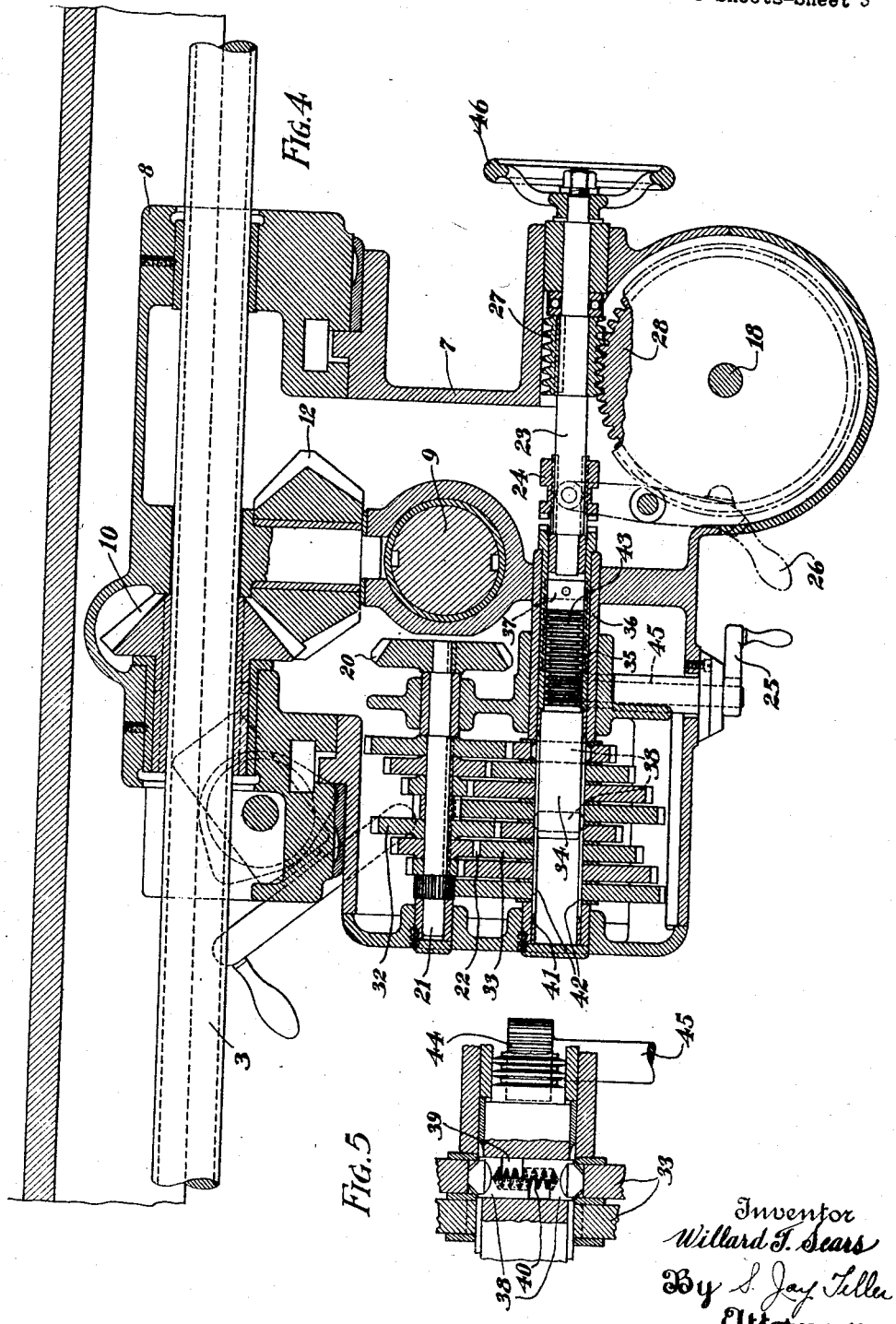

Patented Sept. 30, 1924.

1,509,880

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

CHANGE-SPEED MECHANISM FOR DRILLING MACHINES.

Application filed September 30, 1920. Serial No. 413,935.

*To all whom it may concern:*

Be it known that I, WILLARD T. SEARS, a citizen of the United States, residing at Montclair, in the county of Essex and State of New Jersey, have invented certain new and useful Improvements in Change-Speed Mechanism for Drilling Machines, of which the following is a specification.

This invention relates to an improved change speed mechanism and particularly to such a mechanism as applied to the spindle feed mechanism of a drilling machine. In drilling machines, the spindle driving mechanism including the change speed gearing is ordinarily placed on the drill head and, for convenience in operation and economy of space, this mechanism should be as compact as possible. Accordingly the present invention has for its primary object the production of a change speed mechanism which is very compact and so simple in structure and operation as to be particularly adapted for use in a drilling machine as shown. Other and more specific objects of the invention will appear as the description proceeds.

Referring to the figures of the drawings:

Figure 1 is a front elevation of a radial drill embodying the invention.

Fig. 2 is an end view thereof.

Fig. 4 is a fragmentary sectional view taken along the line 4—4 of Fig. 3 and showing particularly the improved change speed mechanism.

Fig. 5 is an enlarged detail view of a portion of the change speed mechanism.

Figure 3:
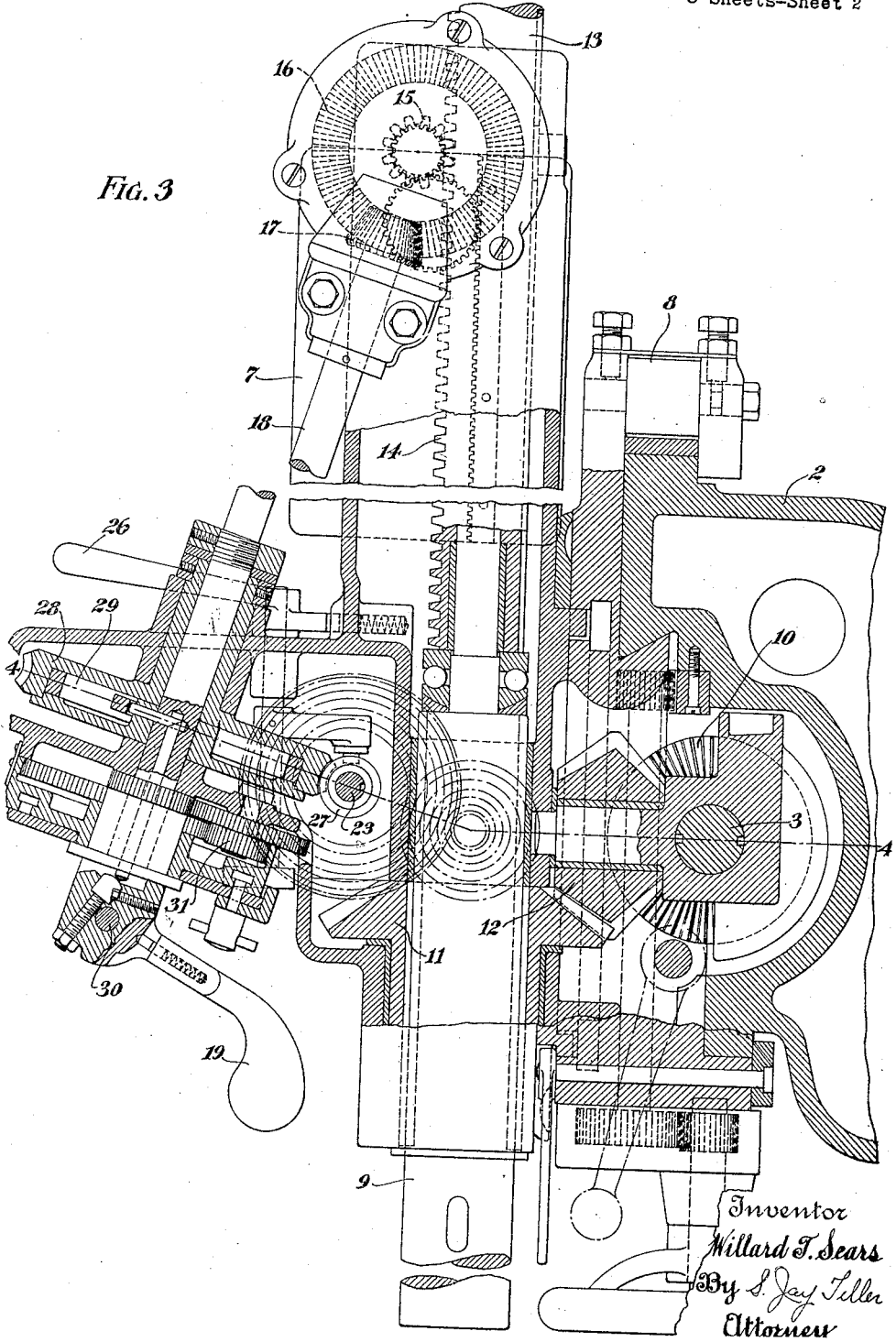
Fig. 3 is a vertical transverse sectional view taken through the arm and the spindle.

The drilling machine illustrated herein is in general like that illustrated in my Patent No. 1,368,294, dated February 15, 1921, the principal difference being in the improved change speed mechanism.

Referring to the drawings, 1 represents the column and 2 the horizontal arm which is vertically adjustable with respect to the column. Extending longitudinally of the arm 2 is a driving member comprising a power shaft 3 mounted in bearings at the ends of the arm. For driving the shaft 3 I have illustrated an electric motor 4 which is mounted at the rear side of the column. The motor is carried by a connecting piece 5 which extends through the column between the two sections thereof and which also carries the arm 2. The shaft 3 extends through the column and preferably suitable change speed gearing is contained within the casing 6 wherein the speed ratio between the motor shaft and the driving shaft 3 may be varied.

The drill head 7 is supported for angular adjustment on a saddle 8 slidable on the arm 2. The drill spindle 9 mounted in the head 7 is driven from the arm shaft 3 through the bevel gears 10 and 11 on the shaft 3 and spindle 9 respectively, and the intermediate double bevel gear 12. Suitable means is provided for moving the spindle 9 longitudinally to position the drilling tool with respect to the work or to feed it or withdraw it. As illustrated, the spindle 9 is connected at its upper end with a non-rotatable arm or sleeve 13 which is provided with rack teeth 14. The teeth 14 mesh with a pinion 15 which is connected with a bevel gear 16. A bevel pinion 17 is secured to an inclined feed shaft 18 and meshes with the gear 16. At the lower end of the shaft 18 is a handle 19 by means of which the shaft can be turned, thus rotating the gears 15 and 16 and raising or lowering the spindle.

In order that the spindle may be moved by power to effect feeding, a bevel gear 20 on a shaft 21 meshes with the bevel gear 11 on the spindle. The change speed gearing 22, to be hereinafter more fully described, connects the shaft 21 with a parallel shaft 23, preferably through a jaw clutch 24. The gearing can be adjusted by means of a handle 25, hereinafter described, and the clutch 24 can be engaged or disengaged by means of a hand lever 26. The shaft 23 carries a worm 27 which meshes with a worm wheel 28 rotatably mounted on the shaft 18. Associated with the worm wheel 28 is a friction clutch 29, the driven element of which is connected to the shaft 18. The clutch 29 can be engaged or disengaged by moving the handle 19 about a pivotal axis at 30. The feeding movement of the spindle is adapted to be automatically stopped at the end of the desired drilling operation by mechanism driven from the shaft 18 through suitable reduction gearing 31. Such mechanism comprises no part of the present invention and is therefore not further described herein. It will be seen that when the clutches 24 and 29 are engaged, power will be transmitted through the connections described from the gear 20 to the shaft 18 which is slowly rotated. From the shaft 18 longitudinal feeding movement is transmitted to the spindle in a way already described. The rate of feed can be varied through the gearing 22 by means of the handle 25.

The improved change speed mechanism comprises a plurality of gears 32 keyed to the shaft 21 and meshing with a like number of companion gears 33 on a shaft 34. The shaft 34 is operatively connected with the before mentioned shaft 23 by means of a sleeve 35 rotatably mounted within a bearing 36, the shaft 34 having a key 37 slidable in longitudinal spline grooves within the sleeve whereby a longitudinal movement of the shaft is permitted within the sleeve. The end of the sleeve adjacent the clutch 24 is toothed whereby the shaft 23 may be connected thereto through the clutch. I preferably mount the driving key or keys 38 directly on the shaft 34, two pairs of such keys being provided as illustrated. Each pair of these keys, as illustrated in Fig. 5, comprises two oppositely disposed keys mounted in a diametrical slot 39 in the shaft 34 and normally pressed outward into engagement with the keyways in the gears by means of a spring 40. The gears 33 are supported directly on a sleeve 41 having two longitudinal slots 42 therein for receiving the keys 38. The end of the shaft 34 within the sleeve 35 is formed with circular rack teeth 43 which teeth are engaged by a pinion 44 mounted on a shaft 45. The shaft 45 is adapted to be rotated by means of the handle 25 whereby the keys 38 are shifted to engage any one of the gears 33 to obtain the desired feed speed. When the clutch 24 is disengaged, the spindle may be fed by hand through the hand wheel 46.

It will be noted that with the gearing illustrated, eight speed changes are obtainable and that the entire change speed mechanism is exceedingly compact. The gears 33 are placed directly adjacent each other on the sleeve 41 along the longitudinally movable shaft 34. By providing two keys in the shaft it is necessary to shift this shaft and its keys only one-half the length of the eight gears to obtain the eight different speeds. When either key is engaged with any gear, the other key is in an inoperative position between the two gears, as illustrated in Fig. 4, the spring 40 permitting the radial inward movement of the keys. By forming the inner portion of the shaft 34 into a rack and using the same for shifting the shaft longitudinally, instead of using a separate key shifting member extending externally of the gear casing as is the usual practice, a considerable shortening of the mechanism and a more compact arrangement is obtained. The locating of the pinion 44 between the driving device, as the gears 33, and the driven device, as the worm wheel 28, as well as using the same shaft, as the shaft 34, for supporting the keys and for performing the driving operation, are improved features in the combination comprising this invention. It will be seen that the sliding shaft 34 even in its extreme outer position is within the outlines of the gear casing.

What I claim is:

1. A change speed mechanism, comprising the combination of a driving device and a driven device, means including a longitudinally movable shaft rotatably connecting such devices in a manner whereby the entire driving torque is transmitted through such shaft, one of the devices comprising a plurality of differently diametered gears mounted on the shaft and operatively engaged by a like number of companion gears on a parallel shaft, two keys mounted on the first mentioned shaft in spaced relation therealong and adapted to be engaged alternately with certain of the gears, either key being disengaged when the other key is engaged, and means for moving the first said shaft longitudinally to operatively engage the keys successively with the first mentioned gears.

2. A change speed mechanism, comprising the combination of a driving device and a driven device, means including a longitudinally movable shaft rotatably connecting such devices in a manner whereby the entire driving torque is transmitted through such shaft, one of the devices comprising a plurality of differently diametered gears mounted on the shaft and operatively engaged by a like number of companion gears on a parallel shaft, two keys mounted on the first mentioned shaft in spaced relation therealong and adapted to be engaged alternately with certain of the gears, either key being disengaged when the other key is engaged, and means between the two devices for moving the first said shaft longitudinally to operative engage the keys successively with the first mentioned gears.

3. A change speed mechanism, comprising the combination of a driving device and a driven device, means including a longitudinally movable shaft rotatably connecting such devices in a manner whereby the entire driving torque is transmitted through such shaft, one of the devices comprising a plurality of differently diametered gears mounted on the shaft and operatively engaged by a like number of companion gears on a parallel shaft, two keys mounted on the first mentioned shaft in spaced relation therealong and adapted to be engaged alternately with certain of the gears, either key being disengaged when the other key is engaged, means for moving the first said shaft longitudinally to operatively engage the keys with the first mentioned gears successively, and a clutch between the two devices for engaging and disengaging the first said shaft and its device relative to the other device.

4. A change speed mechanism for feeding a spindle longitudinally, comprising change speed gearing rotatably connected to the spindle, a longitudinally movable shaft extending axially through a plurality of gears of the said gearing, a plurality of keys mounted in spaced relation on the shaft and adapted upon longitudinal movement of the shaft to be engaged successively with the said gears, means connected to the spindle and operated by the shaft for feeding the spindle longitudinally, and means between the change speed gearing and the said means for sliding the shaft longitudinally.

5. A change speed mechanism for feeding a spindle longitudinally, comprising change speed gearing rotatably connected to the spindle, a longitudinally movable shaft extending axially through a plurality of gears of the said gearing, a plurality of keys mounted in spaced relation on the shaft and adapted upon longitudinal movement of the shaft to be engaged successively with the said gears, rack and pinion means for feeding the spindle longitudinally, a shaft operatively connected with the longitudinally sliding shaft for operating the pinion, and rack and pinion means between the change speed gearing and the second mentioned shaft for sliding the first mentioned shaft longitudinally.

6. A change speed mechanism for feeding a spindle longitudinally, comprising change speed gearing rotatably connected to the spindle, a longitudinally movable shaft extending axially through a plurality of gears of the said gearing, a plurality of keys mounted in spaced relation on the shaft and adapted upon longitudinal movement of the shaft to be engaged successively with the said gears, means connected to the spindle and operated by the shaft for feeding the spindle longitudinally, means between the change speed gearing and the said means for sliding the shaft longitudinally, and a clutch also between the change speed gearing and the first said means whereby the spindle feeding mechanism may be engaged or disengaged relative to its operating mechanism.

In testimony whereof, I hereto affix my signature.

WILLARD T. SEARS.